M. E. KEELEY.
SWIFT BRACE FOR REELS.
APPLICATION FILED JAN. 18, 1916. RENEWED SEPT. 17, 1917.
1,264,942.
Patented May 7, 1918.
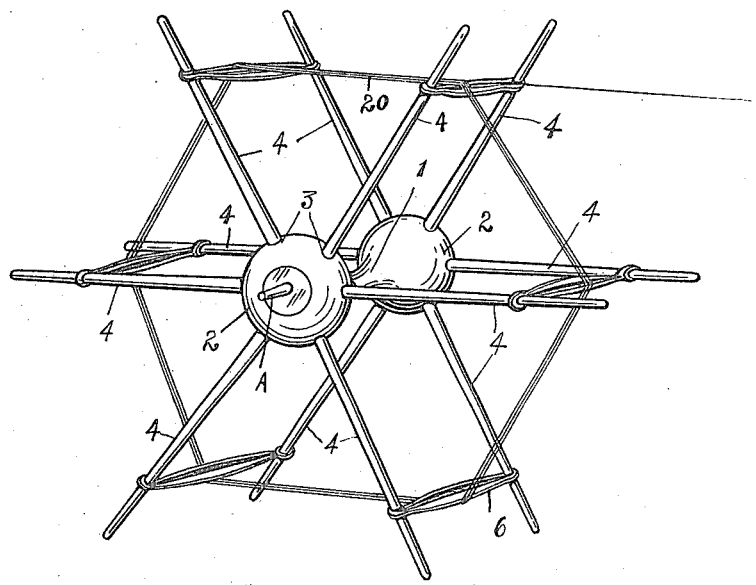
Fig 1
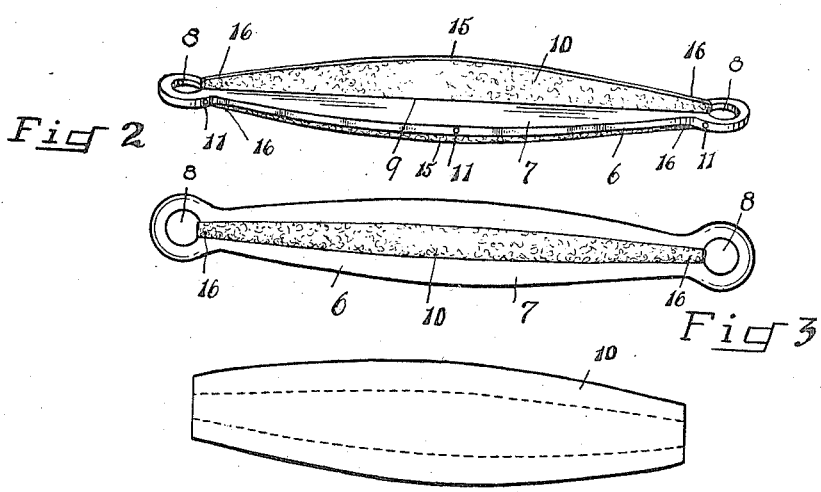
Fig 2
Fig 3
Fig 4
INVENTOR
MICHAEL E. KEELEY
BY
Thomas L. Wilder
ATTORNEY

UNITED STATES PATENT OFFICE.

MICHAEL E. KEELEY, OF CHADWICKS, NEW YORK.

SWIFT-BRACE FOR REELS.

1,264,942. Specification of Letters Patent. Patented May 7, 1918.

Application filed January 18, 1916, Serial No. 72,850. Renewed September 17, 1917. Serial No. 191,899.

*To all whom it may concern:*

Be it known that I, MICHAEL E. KEELEY, a citizen of the United States, residing at Chadwicks, in the county of Oneida and State of New York, have invented certain new and useful Improvements in Swift-Braces for Reels, of which the following is a specification, reference being had therein to the accompanying drawing.

My invention relates to a swift brace for reels, and I declare the following to be a full, clear, concise and exact description thereof sufficient to enable any one skilled in the art to which it appertains to make and use the same, reference being had to the accompanying drawings in which like reference characters refer to like parts throughout the specification.

The object of the invention is to provide a simple, efficient swift brace for use more particularly upon a reel or turning instrument for transferring or rewinding the skeins of silk yarn onto a bobbin or cone. The device effects a great economy in the art by reason of the fact that it keeps the threads of the silk in constant lateral position with reference to each other, whereby to prevent them from crossing or tangling and thereby breaking or the consequent cutting and consignment to the waste heap by the operator of the reel, as often happens when the skein is reduced in size under the old method of rewinding.

Furthermore, the brace is adapted to accomplish this same function not only for the finest sizes of silk yarn but also for the finest sizes of cotton or other yarns.

This object will be more apparent by referring to the drawings in which:

Figure 1 is a perspective view of a reel employing the novel swift brace;

Fig. 2 is an enlarged perspective detail view of the swift brace;

Fig. 3 is a plan view enlarged, of the swift brace;

Fig. 4 is an enlarged diagrammatic view of the felt employed, showing the same spread out before being folded.

Referring more particularly to the drawings, the reel embodies a frame of the take down variety having a hub —1— shaped somewhat like a dumb-bell and provided with the bearings or trunnions A that rest in suitable journals, not shown. The bell portions 2—2 are furnished with the radially disposed cylindrical recesses 3 for the detachable reception of the ends of the arms 4, whose ends fit into said recesses 3 in a snug manner, so as to be held normally therein by friction. The arms 4 taper from their free ends toward the portions thereof adjacent the hub —1—. Each pair of the arms 4 converge slightly toward the center because of the like disposition of the recesses 3 into which the ends thereof are received.

The free ends of each pair of the arms 4 are sprung slightly toward each other, whereby to receive a swift brace 6 that has a body portion 7 made of hardened fiber. This portion 7 is formed with the two orifices 8—8 adapted for assembling the swift brace upon a pair of the arms 4. The orifices 8 are sufficiently large to permit the brace 6 to slide down a given distance toward the center upon the tapering arms 4. The limiting distance being that which will accommodate the smallest size skein of silk. However, each brace 6 can be held at any adjusted position along each pair of arms 4 between the limiting location and the other or free ends, because of the normal tension outward of the arms 4.

Furthermore, the body portion 7 of each brace 6 has a central narrow recess or longitudinal slot 9 suitable for the disposition of a piece of felt 10, that is shown diagrammatically in Fig. 4, and folded along the dotted lines and sewed, so as to furnish, when assembled to the portion 7, a projecting surface that tapers from the center 15 toward either end of the brace 6, at 16—16.

The projecting portion of the felt 10 is arranged symmetrically with respect to the body portion 7, whereby the brace 6 can be reversed for use, if found desirable because of wear on one surface. The felt 10 is held in assembled position within the narrow recess 9 of the portion 7 by the brads 11, and extends well within the orifices 8 in order to make a close union with the adjacent surfaces of the arms 4, when the brace 6 is in assembled position, whereby to prevent any of the threads of the silk skein from lodging therebetween.

In operation, the skein of silk 20 is disposed upon the reel with one end fastened to the bobbin or cone upon which the silk is to be wound. As the bobbin revolves and thereby exerts a pull upon the silk thread, it will cause the reel to turn and unwind the silk skein 20. The surface of the felt 10 possesses sufficient adhesion for the silk threads to prevent them from crossing or tangling and thereby breaking or of the necessity of cutting, which is wasteful. Moreover, the slant or taper of the felt 10 from the center 15 toward the ends 16 will aid also in this function of separating the threads of silk, so that the skein of silk can be completely rewound, from end to end, upon the bobbin, without wasting any part thereof.

Having thus described my invention, what I claim as new and desire to secure by Letters Patent is:

1. A swift brace for reels comprising a support having a tapered felt surface for preventing the crossing of the threads of silk disposed thereon.

2. In a swift brace for reels, a body portion made of hardened fiber, and a tapering felt surface disposed within the hardened fiber for preventing the threads disposed thereon from tangling.

3. In a swift brace for reels, a body portion having a longitudinal slot, and a piece of felt secured in said longitudinal slot, whereby to prevent the tangling of the threads of silk disposed thereon.

4. In a swift brace for reels, a body portion having a longitudinal slot, a piece of felt having a projecting surface that tapers toward either end secured in said longitudinal slot, and orifices in said body portion, whereby the same may be assembled to the arms of the reel.

In testimony whereof I have affixed my signature.

MICHAEL E. KEELEY.

Copies of this patent may be obtained for five cents each, by addressing the "Commissioner of Patents, Washington, D. C."